United States Patent
Noguchi

(10) Patent No.: US 9,651,927 B2
(45) Date of Patent: May 16, 2017

(54) POWER SUPPLY CONTROL SYSTEM AND POWER SUPPLY CONTROL METHOD

(71) Applicant: KYOCERA CORPORATION, Kyoto (JP)

(72) Inventor: Ryo Noguchi, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 416 days.

(21) Appl. No.: 14/360,455

(22) PCT Filed: Nov. 21, 2012

(86) PCT No.: PCT/JP2012/007493
§ 371 (c)(1),
(2) Date: May 23, 2014

(87) PCT Pub. No.: WO2013/076985
PCT Pub. Date: May 30, 2013

(65) Prior Publication Data
US 2014/0288724 A1 Sep. 25, 2014

(30) Foreign Application Priority Data
Nov. 24, 2011 (JP) .................... 2011-256468

(51) Int. Cl.
G05B 15/02 (2006.01)
H01M 8/04858 (2016.01)
(Continued)

(52) U.S. Cl.
CPC ........ *G05B 15/02* (2013.01); *H01M 8/04626* (2013.01); *H01M 8/04925* (2013.01);
(Continued)

(58) Field of Classification Search
CPC G05B 15/02; H01M 8/04626; H01M 16/006; H01M 8/04925; H01M 2220/10;
(Continued)

(56) References Cited

U.S. PATENT DOCUMENTS 5,334,463 A    8/1994  Tajima et al.
6,295,212 B1 * 9/2001  Kayser .................... H02M 1/12
                                                 363/19
(Continued)

FOREIGN PATENT DOCUMENTS

EP    1324456 A1    7/2003
EP    1845575 A1   10/2007
(Continued)

OTHER PUBLICATIONS

Office Action dated Aug. 6, 2015, issued in counterpart Japanese application No. 2015-075104.
(Continued)

*Primary Examiner* — Ramesh Patel
(74) *Attorney, Agent, or Firm* — Procopio Cory Hargreaves and Savitch LLP

(57) ABSTRACT

A power supply control system includes a remaining level detector 22 of a power-storing device 20; and an estimate computing unit 42 which estimates a prospective power generation of power-generating equipment 10 and a prospective load power consumption of connected loads, and thus, based thereupon and remaining level, a dischargeable time until remaining level reaches the minimum level, and computes an average power generation output of a power-generating equipment 10 and an average load power consumption connected loads 101-105, and thus power generation reaching time until the average power generation output reaches the average load power consumption; and a controller 43 which controls, if the dischargeable time is shorter
(Continued)

than the power generation reaching time, to reduce power consumption of the connected loads 101-105.

10 Claims, 3 Drawing Sheets

(51) Int. Cl.
| | | |
|---|---|---|
| *H01M 16/00* | (2006.01) | |
| *H01M 10/48* | (2006.01) | |
| *H02J 7/34* | (2006.01) | |
| *H01M 8/04828* | (2016.01) | |
| *H01M 8/0612* | (2016.01) | |
| *H01M 8/0432* | (2016.01) | |
| *H01M 8/04537* | (2016.01) | |

(52) U.S. Cl.
CPC ........ *H01M 16/006* (2013.01); *H01M 8/0494* (2013.01); *H01M 8/04365* (2013.01); *H01M 8/04604* (2013.01); *H01M 8/04947* (2013.01); *H01M 8/0612* (2013.01); *H01M 10/48* (2013.01); *H01M 2220/10* (2013.01); *H01M 2250/10* (2013.01); *H02J 7/34* (2013.01); *Y02B 90/14* (2013.01)

(58) Field of Classification Search
CPC ......... H01M 2250/10; H01M 8/04604; H01M 8/04365; H01M 8/0494; H01M 8/04947; H01M 8/0612; H01M 10/48; Y02E 60/50; Y02B 90/14; H02J 7/34
See application file for complete search history.

(56) References Cited

U.S. PATENT DOCUMENTS

| | | | |
|---|---|---|---|
| 8,790,836 B2 | 7/2014 | Kaito et al. | |
| 8,900,770 B2 | 12/2014 | Kaito et al. | |
| 2002/0113441 A1* | 8/2002 | Obayashi | H02J 1/14 290/40 C |
| 2003/0072977 A1* | 4/2003 | Speranza | H01M 8/04567 429/9 |
| 2003/0194586 A1 | 10/2003 | Sugiura et al. | |
| 2004/0080304 A1* | 4/2004 | Takehara | H02M 1/36 323/282 |
| 2007/0145949 A1* | 6/2007 | Matsushima | H02J 7/00 320/132 |
| 2007/0274132 A1* | 11/2007 | Ogiwara | G11C 5/14 365/185.23 |
| 2010/0167144 A1 | 7/2010 | Kaito et al. | |
| 2010/0190071 A1 | 7/2010 | Kaito et al. | |
| 2010/0262312 A1* | 10/2010 | Kubota | H01M 10/425 700/295 |
| 2013/0049468 A1* | 2/2013 | Iwasaki | H02J 7/35 307/48 |
| 2013/0134940 A1* | 5/2013 | Tominaga | B60L 11/1846 320/109 |
| 2013/0181518 A1* | 7/2013 | Suyama | H02J 3/32 307/23 |
| 2013/0270911 A1* | 10/2013 | Baba | H02J 7/34 307/65 |
| 2014/0335430 A1 | 11/2014 | Kaito et al. | |

FOREIGN PATENT DOCUMENTS

| | | |
|---|---|---|
| JP | H05-151983 A | 6/1993 |
| JP | 2003-303605 A | 10/2003 |
| JP | 2006-156165 A | 6/2006 |
| JP | 2006-262613 A | 9/2006 |
| JP | 2009-026738 A | 2/2009 |
| JP | 2010-015783 A | 1/2010 |
| JP | 2010-192380 A | 9/2010 |
| JP | 2010-257648 A | 11/2010 |
| WO | 2011-142330 A1 | 11/2011 |
| WO | 2011/142330 A1 | 11/2011 |

OTHER PUBLICATIONS

Office Action dated Jan. 5, 2016, issued in counterpart Japanese Publication No. 2015-075104.
International Search Report; PCT/JP2012/007493; Jan. 8, 2013.
Extended European Search Report dated Jul. 15, 2015 issued by the European Patent Office for Counterpart European Application No. 12851904.8.

* cited by examiner

POWER SUPPLY CONTROL SYSTEM AND POWER SUPPLY CONTROL METHOD

CROSS REFERENCE TO RELATED APPLICATION

This application claims priority to and the benefit of Japanese Patent Application No. 2011-256468 filed on Nov. 24, 2011, the entire contents of which are incorporated herein by reference.

TECHNICAL FIELD

The present invention relates to a power supply control system and a power supply control method.

BACKGROUND

Recently, as a power-generating equipment, a fuel cell is known, that converts energy from the fuel directly into electricity (for example, see Patent Document 1). A fuel cell is an equipment which has a cathode and a anode disposed sandwiching an electrolyte layer of thin films, and continuously generates electric power by supplying supplementing anode active material (usually hydrogen) to the anode and oxygen and the like in the air as cathode active material to the cathode to cause electrochemical reaction. A fuel cell differs from conventional batteries in that the fuel cell can continuously supply cathode and anode agents.

Currently, no such a home fuel cell system exists, which has a self-sustaining operation function in the event of power failure. However, in recent years, a self-sustaining operation function in case of power failure is in increasing demand. In response to such demand, in order to put in practical use a fuel cell power generation system which is operable being connected to the power grid at normal times or disconnected with the grid on self-sustaining operation in an emergency, or, in order to put in practice a fuel cell power generation system operable in self sustaining manner being disconnected with the grid, it is required to overcome the challenges of load following capability.

The rate of electrochemical reaction occurring in the fuel cell largely depends on temperature of the stack (reaction temperature), and the rate increases as the temperature arises. Current that can be extracted from the fuel cell is constrained by the reaction rate. The reaction process occurring in a fuel cell system is an exothermic process in total, and the reaction temperature depends on the calorific value. The calorific value becomes large as large power generation output is obtained, and the calorific value becomes small as small power generation output is obtained. Therefore, when loads to the fuel cell is small (the current is small), the power generation is lowered, and the reaction rate and reaction temperature are lowered.

With the reaction temperature being not high enough, even if the load increases rapidly, the temperature does not immediately arise. As a result, the reaction rate remaining low, current is limited and thus not able to immediately follow the load. For solid oxide fuel cell of 0.5-1 kW output, it takes few minutes to tens of minutes before the stack temperature arises high enough to follow the load. The diffusion rate of the active material used in the reaction is also dependent on the reaction rate.

With a grid-interconnected fuel cell system, load following is compensated by supplemental power received from the grid. In that case, lack of load following capability does not cause problem. However, with a the fuel cell system operable independently from the grid, or a system operable on self-sustaining operation in case of power failure, load following cannot be compensated and thus causing a problem.

Therefore, in addition to the technology for improving the load following capability of a fuel cell, a system is proposed in which the load following of the fuel system is compensated by discharge from the power-storing device having a storage battery which is equipped to the system (for example, see Patent Document 2).

CITATION LIST

Patent Document 1: JP2010015783A
Patent Document 2: JPH5151983A

The present invention is to provide a power supply control system and a power supply control method which is adapted to efficiently supply power to loads by collaboratively operating a power generating equipment and a power-storing device such that charging and discharging of the power-storing device is appropriately controlled.

SUMMARY

A power supply control system according to the present invention includes:
a power storage level detector configured to detect a remaining level of the power-storing device;
a computing unit and
a controller, such that
the computing unit performs steps of:
computing a prospective power generation of the power-generating equipment and a prospective load power consumption of the connected load;
computing dischargeable time of the power-storing device until the remaining level reaches the minimum level based upon the prospective power generation, the prospective load power consumption and the remaining level detected by the remaining level detector;
computing an average power generation output of the power-generating equipment and an average load power consumption of the load; and
computing a power generation reaching time until the average power generation output reaches the average load power consumption, and
the controller controls, in the case that the dischargeable time computed by the computing unit is shorter than the power generation reaching time, to reduce power consumption of the connected load.

In the case of the power supply control system operating disconnected with grid, the controller compares the dischargeable time computed by the computing unit and the power generation reaching time, and controls the connected load based upon the comparison.

The controller controls, in the case that at least the dischargeable time computed by the computing unit is shorter than the power generation reaching time, and equal to or shorter than a predetermined operation time, to reduce power consumption of the connected load.

If a plurality of loads of different priorities are each connected as the connected load and the dischargeable time computed by the computing unit is shorter than the power generation reaching time, the controller obtains from the computing unit a first dischargeable time which is a dischargeable time in a case that power consumption of a load with the lowest priority among a plurality of the connected loads is reduced, and if the first dischargeable time is shorter than the power generation reaching time and equal to or shorter than the predetermined operation time, the controller reduces power consumption of a load with the lowest priority among a plurality of the connected loads.

The controller controls to switch an operation mode of the connected load from a normal-operation mode to a power-saving-operation mode, to reduce power consumption.

If a plurality of loads of different priorities are each connected as the connected load, the controller obtains from the computing unit a second dischargeable time which is a dischargeable time in a case that a load with the highest priority among loads other than the connected load is connected in the normal-operation mode, and
if the second dischargeable time is equal to or more than the power generation reaching time or the second dischargeable time is longer than a second predetermined operation time which is longer than the predetermined operation time, the controller controls to connect the load.

If a plurality of loads of different priorities are each connected as the connected load, the controller obtains from the computing unit a third dischargeable time which is a dischargeable time in a case that power consumption of a load with the lowest priority among loads among the connected load is reduced and that a load with a lower priority than the load of which power consumption is reduced among disconnected loads in the power-saving mode,
if the third dischargeable time is longer than a third predetermined operation time which is longer than the predetermined operation time, the controller controls to connect the load.

If a load with a lower priority than the highest priority of the unconnected loads is connected, the controller controls to reduce power consumption of the load and to obtain from the computing unit a fourth dischargeable time which is a dischargeable time in a case that a load with the highest priority among disconnected loads other than the load of which power consumption is reduced is connected, and if the fourth dischargeable time is equal to or longer than the power generation reaching time, or the dischargeable time is longer than a fourth predetermined operation time which is longer than the predetermined operation time, the controller controls to connect the corresponding load.

If on the power saving mode a plurality of loads among the connected loads are to be on the power saving mode, the controller obtains from the computing unit a fifth dischargeable time which is a dischargeable time in a case that the power-saving mode of a load with the highest priority among the plurality of the loads is canceled, and
if the fifth dischargeable time is equal to or longer than the power generation reaching time, or the dischargeable time is longer than a fifth predetermined operation time which is longer than the predetermined operation time,
the controller controls to cancel the power-saving-operation mode of the load with the highest priority.

Further, a power supply control method for a power-generating equipment and a power-storing device according to the present invention includes steps of:
a remaining level detector detecting a remaining level of the power-storing device;
a computing unit computing a prospective power generation of the power-generating equipment and a prospective load power consumption of the connected load;
a computing unit computing dischargeable time of the power-storing device until the remaining level reaches the minimum level based upon the prospective power generation, the prospective load power consumption and the remaining level detected by the remaining level detector;
a computing unit computing an average power generation output of the power-generating equipment and an average load power consumption of the load; and
a computing unit computing a power generation reaching time until the average power generation output reaches the average load power consumption, and
a controller controlling in the case that the dischargeable time computed by the computing unit is shorter than the power generation reaching time, to reduce power consumption of the connected load.

BRIEF DESCRIPTION OF DRAWINGS

Embodiments will be further described below with reference to the accompanying drawings, wherein.

DESCRIPTION OF EMBODIMENTS

To implement a method in which a fuel cell operates at its maximum capacity and power is supplied to each load as needed, the capacity of each connected load is required to be taken into consideration. That is, because of time-varying nature of loads, it is required to appropriately allocate power according to the load. Therefore, the control tends to become complicated.

In addition, in the fuel cell system equipped with a power storing device, it is required to control charging and discharging of the power-storing device or loads to be connected so that load does not exceed the power supply capacity. In order to perform such control, it is necessary to predict electric power to be generated by the fuel cell until a predetermined time, and to control based thereupon the loads and charging and discharging. However, with a fuel cell, power generation capacity until the predetermined time varies depending on the temperature of the stack at the time of power generation. For example, when the stack temperature is low, the power generation capacity until a certain time becomes smaller than that at a high temperature. Therefore, it is difficult to accurately predict the power generation amount. Subsequently, during the operation, there may be a case that the remaining level of the power-storing device carelessly runs short, so-called a dead battery may occur, or performance degradation and lowering life of power-storing device may occur due to being overcharged. Such inconveniences apply not only a fuel cell, but also to a power-generating equipment of other kind with low load following capability such as a wind power-generating equipment or the like.

The present invention is to provide a power supply control system and a power supply control method which is adapted to efficiently supply power to loads by collaboratively operating a power generating equipment and a power-storing device such that charging and discharging of the power-storing device is appropriately controlled.

Hereinafter, embodiments of the present invention will be described with reference to the drawings.

Figure 1:
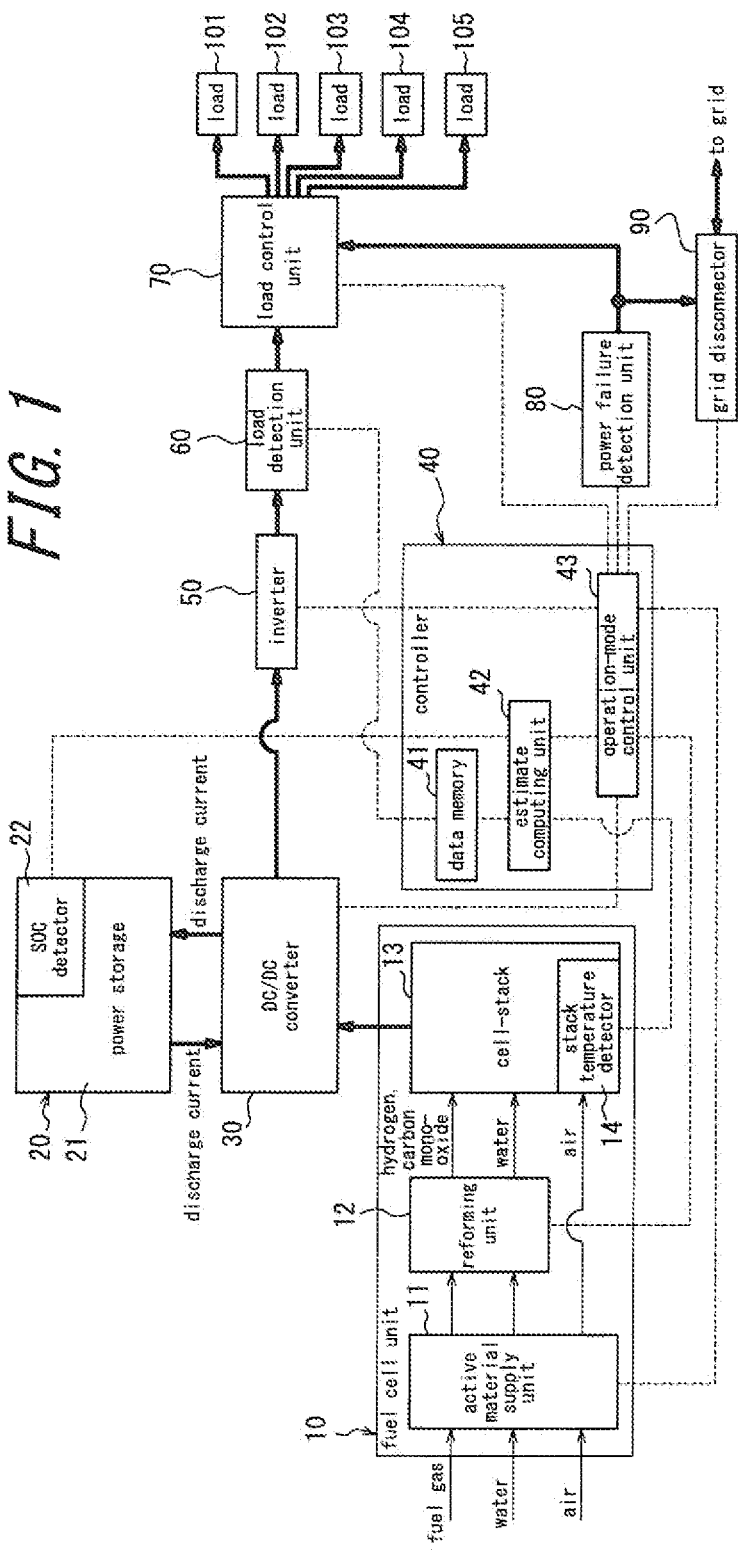
FIG. 1 is a block diagram illustrating a configuration of a power supply control system according to an embodiment of the present invention.

FIG. 1 is a block diagram illustrating a configuration of a power supply control system according to an embodiment of the present invention. This power supply control system includes a fuel cell unit 10 as a power-generating equipment, a power storage 20 as a power-storing device, a DC/DC converter 30, a controller 40, an inverter unit 50, a load detection unit 60, a load control unit 70, a power failure detection unit 80, a grid disconnector 90 and controls power supply to loads 101-105. The loads 101-105 are operated receiving power supplied from the grid at the time of grid interconnection, and are operated by this system's self-sustaining operation at the time of grid disconnection. FIG. 1 illustrates a case that the loads 101-105 are connected, but types and number of the loads to be connected can be set arbitrarily chosen.

The fuel cell unit 10 is provided with an active material supplying units 11, a reforming unit 12, a cell-stack unit 13 and a stack temperature detector 14. The active material supply unit 11 is to send water and fuel gas to the reforming unit 12 and air to the cell-stack unit 13, and has the fuel gas to be delivered, a pump for sending the water and the air, pipes, a flow detector or the like.

The reforming unit 12, reforms the fuel gas from the active material supply unit 11 by being supplied with heat from the outside and generates carbon monoxide and hydrogen as cathode agent, thus sending out produced gas to the cell-stack unit 13.

The cell-stack unit 13 is a fuel cell which includes porous cathode and anode disposed so as to sandwich the electrolyte membrane. By passing the fuel gas from the reforming unit 12 containing carbon monoxide and hydrogen to the cathode and passing the air from the active material supply unit 11 to the anode, cell-stack unit 13 generates electricity between the electrodes. Power generated thereby is fed to the DC/DC converter 30.

The stack temperature detector 14 detects the temperature of inside of the cell-stack unit 13 and transmits to the controller 40 detected temperature information.

The power storage 20 has a storage battery 21 and, as a power storage level detector, a SOC (State Of Charge) detector 22. The storage battery 21 stores the power generated by the cell stack 12 and discharges the power to the loads as needed. The storage capacity of the storage battery 21 is assumed to be sufficient at least to supplement the power shortage of the fuel cell due to load following capability.

The SOC detector 22 detects the remaining level of the storage battery 21. And the detected value is sent to the controller 40.

The DC/DC converter 30 has functions such as charge-discharge control of the power storage 20 and power delivery to the inverter unit 50. Then, the DC/DC converter 30 receives power generated by the cell-stack unit 13 and power discharged from the power storage 20, and converts voltage of these powers to an appropriate voltage according to a control signal from the controller 40 to send an appropriate power to the inverter unit 50. Further, the DC/DC converter 30 sends the power which is output from the cell-stack unit 13 to the power storage 20 in order that the power storage 20 may be charged. Further, the DC/DC converter 30 has a function of adjusting, according to a control signal sent from the controller 40, power to be supplied to each of the power storage 20, the cell-stack unit 13 and the inverter unit 50.

The controller 40 sends control signals each to the fuel cell unit 10, the power storage 20, the DC/DC converter 30, the inverter unit 50, the load detection unit 60, the power failure detection unit 80 and the grid disconnector 90, based on information provided from each of those. Then, the controller 40 executes control to cause power to the loads 101-105 to be supplied from the grid when grid-connected operation, or supplied by collaborative operation of the power storage 20 and the fuel cell unit 10 at self-sustaining operation when the system is disconnected with the grid.

The controller 40 has a data memory 41, a estimate computing unit 42, and an operation-mode control unit 43. The data memory 41 stores information on the power consumption of loads 101-105 that are connected. The power consumption information of loads 101-105 is acquired, for example, through PLC (Power Line Communications), or by a user input operation. In addition, the data memory 41 stores a power-generation characteristic table having the relationship between the maximum power output (P'stck MAX) and power generation capacity (G'stck) of up to a predetermined time period (t), corresponding temperature of the cell-stack unit 13 (Tstck). Hereafter, prime symbols appended to variables represent computed value, not the actual detected value. Therefore, the maximum power output of P'stck MAX when the temperature of the cell-stack unit 13 is T'stck, and power generation output Pstck at the time of actual temperature detection do not necessarily match. Also in the following description, the same applies with regard to the prime symbols are appended to the variable.

The estimate computing unit 42 computes the generated power based on generation characteristics table stored in the data memory 41, charged power of the power storage 20 (storage battery 21) and the detected temperature of the fuel cell unit 10 (cell-stack unit 13), and computes the power consumption and the like from the power consumption information of the loads 101-105, sending the computation result to the operation-mode control unit 43.

The operation-mode control unit 43 determines the operation mode based on the computation result from the estimate computing unit 42 and sends instructions to each unit.

The inverter unit 50 converts the power from the DC/DC converter 30 into electric power suitable to the loads 101-105 or the grid, and sends the converted power to the load detection unit 60. That is, the power converted by the DC/DC converter 30 has DC voltage, which is converted to commercial AC voltage by the inverter 50.

The load detection unit 60 detects the voltage and current values of the power delivered from the inverter unit 50, and notifies it to the controller 40.

The load control unit 70 is configured by using connectors for connecting loads 101-105 and power lines to be used in self-sustaining operation when disconnected with the grid, switches for controlling power supply to loads 101-105, load protection device for protecting the system and the loads when unusual load connected, detecting means for detecting the power consumption of the loads 101-105, and the like. Then, the load control unit 70 notifies the controller 40 of the detected power consumption of each loads 101-105. The power consumption which has been notified is stored in the data memory 41. In addition, the load control unit 70 individually control power supply to the loads 101-105 based on a control signal from the controller 40 at the time of the self-sustaining operation and grid interconnection. Some or all of the load control unit 70 and the controller 40 may configure EMS (Energy Management System), for example, HEMS (Home Energy Management System) and the like.

At the time of grid interconnection operation, the power failure detection unit 80 has a function of detecting the power failure of the system and notifying the detection of power failure to the controller 40.

The grid disconnector 90, which is a switch operating based on a control signal from the controller 40, connects the system to the grid at the time of grid interconnection, and blocks the system from the grid at the time of anomalous occurrence such as shut down of the system or the grid power failure.

In FIG. 1, the fuel cell unit 10 and the controller 40 operates by power supplied from the grid or the system. In the above configuration, the controller 40 may be configured using software running on any appropriate processor such as a CPU (Central Processing Unit) or the like. Further, the operation-mode control unit 43 and the estimate computing unit 42 may be configured by using a dedicated processor (e.g., DSP (digital signal processor)). Further, the inverter unit 50 and the load detection unit 60 may be collectively configured without being separated from each other. Also, the inverter unit 50 may have the function of power failure detection unit 80 and the grid disconnector 90, such that these are configured as a single block. Incidentally, in FIG. 1, a thick solid line represents a power line, a dashed line represents a control signal line, a thin solid line in the fuel cell unit 10 represents an active material (reactant) line.

Two examples of power supply control method of the self-sustaining operation by the power supply control system according to the present embodiment will be explained with reference to the flow-chart illustrated in FIGS. 2 and 3. However, in examples described below, the storage battery 21 capacity reduction due to deterioration is not taken into account. Further, the loads 101-105 to be connected may be arbitrarily prioritized by the user preference, etc. However, it is described that the priority descends in the order of 105 loads 101, and 102, 103, 104.

First Example

Figure 2:
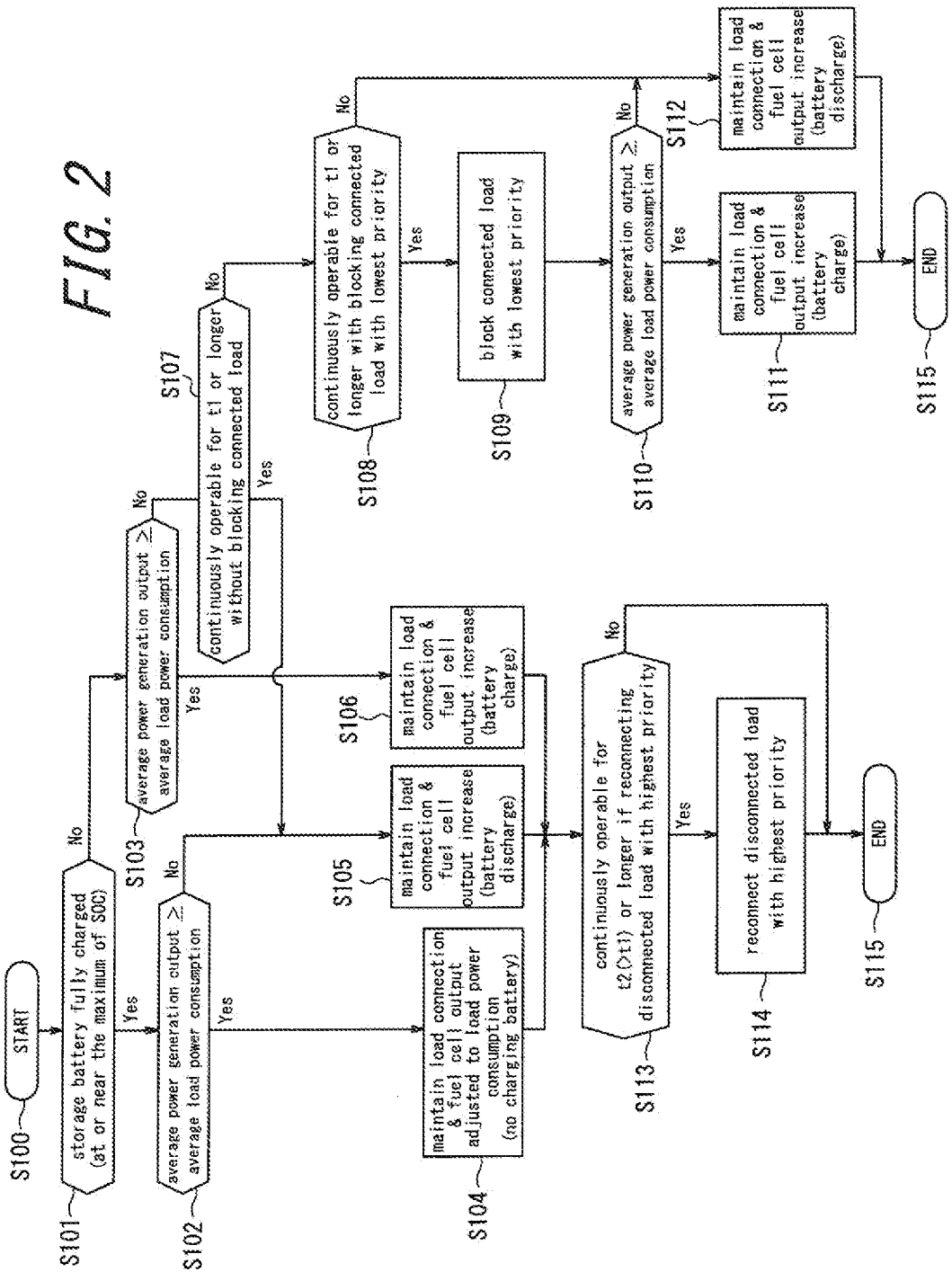
FIG. 2 is a flow-chart illustrating a control operation according to a power supply control method of the power supply control system of FIG. 1.

FIG. 2 is a flow-chart illustrating the first example. The first example is for controlling power allocation such that power is preferentially allocated to the loads of higher priority. Hereafter, it is assumed that the loads 101 and 104 are connected in operational state. First, at step S100, the self-sustaining operation is started by the controller 40, and the flow is looped.

After the self-sustaining operation starts, at step S101, the SOC detector 22 detects remaining battery level, and notifies the estimate computing unit 42 of the information of remaining battery level. The estimate computing unit 42 computes the remaining battery capacity from the information on the remaining battery level, and notifies the operation-mode control unit 43 of the result. Then the operation-mode control unit 43 determines fully charged, when the remaining battery level is above a predetermined level (e.g., at or near the maximum), and proceeds to the normal-operation mode after step S102 In contrast, when the battery remaining battery level is a predetermined value or less, the operation-mode control unit 43 determines not fully charged, and proceeds to processing at step S103.

At step S102, the DC/DC converter 30 detects the voltage Vstck and the current value Istck of the cell-stack unit 13 within a predetermined time period. The current value Istck and voltage Vstck that have been detected are stored in the data memory 41. On the basis of the current value Istck and voltage Vstck stored in the data memory 41, the estimate computing unit 42 computes the average power output Pstck of the fuel cell unit 10 of that time period.

Also, the load detection unit 60 detects the power consumption of the loads (in this case, loads 101 and 104) during the operation within a predetermined time period. The load power consumption is stored in the data memory 41. Based on the load power consumption in a predetermined time period that is stored in the data memory 41, the estimate computing unit 42 computes the average load power consumption Pcs of the load in that time period. The average load power consumption Pcs is stored in the data memory 41.

The operation-mode control unit 43 proceeds to normal-operation mode at step S104, when it is determined that the average power output Pstck is above or equal to the average load power consumption Pcs (in the case of Pstck≥Pcs). In contrast, (in the case of Pstck<Pcs), operation-mode control unit 43 proceeds to processing on normal-operation mode of step S105 when it is determined that the average power output Pstck is below the average load power consumption Pcs.

At step S103, similarly to step S102, the DC/DC converter 30 detects the current value Istck and voltage Vstck of the cell-stack unit 13 within a predetermined time period. Detected current value Istck and voltage Vstck are stored in the data memory 41. On the basis of the current value Istck and voltage Vstck stored in the data memory 41, the estimate computing unit 42 computes the average power output Pstck of the fuel cell unit 10 of the time period.

In addition, the load detection unit 60 detects the load power consumption within a predetermined time period. The load power consumption is stored in the data memory 41. Based on the load power consumption at a predetermined time period that is stored in the data memory 41, the estimate computing unit 42 computes the average load power consumption Pcs of the time period. The average load power consumption Pcs, is stored in the data memory 41.

The operation-mode control unit 43 compares the average load power consumption Pcs with the average power output Pstck. In case of Pstck≥Pcs, the operation-mode control unit 43 proceeds to the normal-operation mode at the step S106. In contrast, in the case of Pstck<Pcs, the operation-mode control unit 43 proceeds to processing at step S107.

The state at step S107 is such that the average power output Pstck of the fuel cell unit 10 does not satisfy the average load power consumption Pcs, and the storage battery 21 is not fully charged. Here, the operation-mode control unit 43 determines, without blocking any of the connected loads 101 and 104, whether or not shortage of generated power can be compensated by discharge of the storage battery 21 until a predetermined operation time t1. In other words, it is determined whether or not continuous operation of the predetermined operation time t1 or longer is possible. The predetermined operation time t1 may be appropriately set or changed by the user or the like.

Therefore, the estimate computing unit 42 estimates the prospective power generation G'stck until the predetermined time t according to the power generation characteristics table stored in the data memory 41 on the basis of the temperature Tstck of the cell-stack unit 13. In addition, the estimate computing unit 42 estimates the prospective load power consumption W't up to the predetermined time t. Assuming loads 101 and 104 are nearly constant, the prospective load power consumption W't is considered such that W't=Pcst.

Then, the estimate computing unit 42, by using the computed prospective power generation G'stck and prospective load power consumption W't, computes dischargeable time t'batL (charge rate is not necessarily 0%) of the storage battery 21 (charge rate is not necessarily 0%) until the remaining charge level reaches the lowest remaining level EbatL. Here, assuming that the initial level of the storage battery 21 detected by the SOC detector 22 is Ebat0, the remaining battery level of storage battery 21 Ebat until the predetermined time t is given by the following equation (1).

$$Ebat = Ebat0 + G'stck - W't \tag{1}$$

From the above equation (1), in the case that the storage battery 21 reaches the lowest remaining level EbatL, the lowest remaining level EbatL is given by equation (2).

$$EbatL = Ebat0 + G'stck - W't \tag{2}$$

The estimate computing unit 42 estimates according to the above equation (2) dischargeable time t'batL until reaching the lowest remaining level EbatL assuming the prospective load power consumption W't and prospective power generation G'stck as functions of time t.

Here, relationship between the average load power consumption Pcs and the average power output Pstck such as Pstck<Pcs is established, thus "NO" at step S103 and step S107. In this relationship, as the output of the fuel cell unit 10 gradually increases, the average power output Pstck eventually exceeds the average load power consumption Pcs. The estimate computing unit 42 computes time until Pstck=Pcs as a power generation reaching time t'eq for the prospective power generation to reach the prospective load power consumption.

The operation-mode control unit 43 compares the dischargeable time t'batL and the power generation reaching time t'eq. In the case of t'batL≥t'eq, that is, the power generation reaching time t'eq elapses without the level of the storage battery 21 dropping to the lowest remaining level EbatL, the power shortage does not occur. In other words, the loads 101 and 104 can be continuously supplied with power. That is, in the case of "Yes" at step S107, the operation-mode control unit 43 determines that loads 101 and 104 are operable for the predetermined operation time t1 or longer, and proceeds to the processing of the normal-operation mode at step S105. Therefore, in this case, the loads 101 and 104 are operated by the output power of the fuel cell unit 10 and discharged power of the storage battery 21.

On the other hand, in the case of t'batL<t'eq, the level of the storage battery 21 may reach the lowest remaining level EbatL before completion of load following operation. In this case, the operation-mode control unit 43 determines whether the connected loads 101 and 104 are continuously operational for the predetermined operation time t1 or longer.

As a result, in the case that the predetermined operation time t1 is shorter than the dischargeable time t'batL (t1<t'batL), the operation-mode control unit 43 determines that the loads 101 and 104 can continuously operate for the predetermined operation time t1 or longer ("Yes" at step S107), and proceeds to the process of normal-operation mode at the step S105. Thus, also in this case, the loads 101 and 104 are operated by the output power of the fuel cell unit 10 and the discharged power of the storage battery 21.

In contrast, in the case of the predetermined operation time t1 being longer than the dischargeable time t'batL (t1≥t'batL), the operation-mode control unit 43 determines the loads 101 and 104 cannot continuously operate for the predetermined operation time t1 or longer ("No" at step S107), and proceeds to processing at step S108.

Subsequently, steps S104, S105,106 and 108 will be described, as a result of determination at steps S102, at 103 and 107.

At the normal-operation mode of the step S104, the average power output Pstck of the fuel cell unit 10 meets the average load power consumption Pcs. Therefore, the operation-mode control unit 43 maintains the connection of the loads 101 and 104 without instructing the load control unit 70 to change the control. Further, in order to match the output of the fuel cell unit 10 and the power consumption of the loads 101 and 102 (to lower the output), the operation-mode control unit 43 computes each of the required fuel gas flow rate, water flow rate and air flow rate, and sends them as command values to the active material supply unit 11. Thus, the active material supply unit 11 controls each pump based on the notified command value.

In addition, because the storage battery 21 is fully charged, the operation-mode control unit 43 controls the DC/DC converter 30 to cause charging of the storage battery 21 to be stopped. Therefore, in this case, the loads 101 and 104 are operated by the output power of the fuel cell unit 10. Then, the operation-mode control unit 43 proceeds to processing at step S113.

Subsequently, the normal-operation mode of step S105 will be described. When the procedure reaches the normal-operation mode at step S105 after step S102, the average power output Pstck of the fuel cell portion 10 is less than the average load power consumption Pcs, but the storage battery 21 is fully charged. In addition, in the case that the procedure reaches the normal-operation mode at step S105 after the step S107, the average power output Pstck of the fuel cell unit 10 is not less than the average load power consumption Pcs, and the storage battery 21 is not fully charged. In these cases, there are differences in the level of the storage battery 21, but both of the loads 101 and 104 can be operated by the output power of the fuel cell unit 10 and the power discharged from the storage battery 21.

Therefore, the operation-mode control unit 43 maintains the connection of the loads 101 and 104 without instructing the load control unit 70 to change the control. In order to increase the output of the fuel cell unit 10 at a constant rate, the operation-mode control unit 43 computes required fuel gas flow rate, water flow rate and air flow rate and sends them to the active material supply unit 11 as command values. Thus, the active material supply unit 11 controls each pump based on the notified command values.

Also, the operation-mode control unit 43 controls the DC/DC converter 30 to cause the charge current of the storage battery 21 to become zero and discharge to take place. As a result, the loads 101 and 104 are operated by the output power of the fuel cell unit 10 and the discharged power of the storage battery 21. Then, the operation-mode control unit 43 proceeds to processing at step S113.

In the normal-operation mode of the step S106, the average power output Pstck of the fuel cell unit 10 meets the average load power consumption Pcs. Therefore, the operation-mode control unit 43 maintains the connection of the loads 101 and 104, without instructing the load control unit 70 to change the control. However, since storage battery 21 is not fully charged, in order to increase the output of the fuel cell unit 10 at a constant rate, the operation-mode control unit 43 computes each of the required fuel gas flow rate, water flow rate and air flow rate, and sends them to the active material supply unit 11 as command values. Thus, the active material supply unit 11 controls each pump based on the notified command values.

In addition, the operation-mode control unit 43 controls the DC/DC converter 30 to cause the discharge current of storage battery 21 to become zero and charging to take place. Therefore, in this case, the loads 101 and 104 are operated by the output power of the fuel cell unit 10. In addition, the storage battery 21 is charged by the output power of the fuel cell unit 10. Then, the operation-mode control unit 43 proceeds to processing at step S113.

Subsequently, the case will be described, such as "No" at step S107, that is, t1≥t'batL, where it is determined the loads 101 and 104 cannot continuously operate a predetermined operation time t1 or longer, and the procedure proceeds to processing at step S108. At step S108, the operation-mode control unit 43 determines, assuming that the load of the lowest priority (the load 101) is blocked, whether the remaining connected load (the load 104 in this case) can continuously operate for the predetermined time t1 or longer. Therefore, the estimate computing unit 42 estimates, similarly to description at step S107, the prospective power generation G'stck until a predetermined time t according to the power generation characteristic table on the basis of the temperature Tstck of the cell-stack unit 13. In addition, the estimate computing unit 42 estimates the prospective load power consumption W't of the load 101 up to the predetermined time t.

Also, the estimate computing unit 42 estimates, similarly to description of step S107, in the case of the load 104 being blocked, dischargeable time t'batL until the storage battery 21 reaching the lowest remaining level EbatL and a power generation reaching time t'eq until Pstck=Pcs The operation-mode control unit 43 compares the amount of power generation reaching time t'eq and dischargeable time t'batL. As a result, in the case of the dischargeable time t'batL longer than the power generation reaching time t'eq (t'batL≥t'eq), i.e., the power generation reaching time t'eq elapses without the level of the storage battery 21 reaching the lowest remaining level EbatL, continuous power supply to the load 101 is possible ("No" at step S108). In this case, the operation-mode control unit 43 proceeds to the normal-operation mode at step S112.

In contrast, in the case of the dischargeable time t'batL being shorter than the power generation reaching time t'eq (t'batL<t'eq), the level of the storage battery 21 may reach the lowest remaining level EbatL before completion of load following operation. In this case, the operation-mode control unit 43 determines whether the connected load 101 can continuously operate for a predetermined operation time t1 or longer.

As a result, in the case of the predetermined operation time t1 being shorter than the dischargeable time t'batL (t1<t'batL), the operation-mode control unit 43 determines that the load 101 can continuously operate for the predetermined operation time t1 or longer ("No" at S108), and proceeds to the normal-operation mode of the step S112. In contrast, in the case of the predetermined operation time t1 being longer than the dischargeable time t'batL (t1≥t'batL), the operation-mode control unit 43 determines that the load 101 cannot continuously operate for the predetermined operation time t1 or longer ("Yes" at step S108), and proceeds to the power-saving operation mode of the step S109.

At step S109, the operation-mode control unit 43 commands the load control unit 70 to block the load of the lowest priority among the connected loads 101 and 104 (in this case, the load 104). As a result, the load 104 is disconnected. The blocking referred to here may include a control such as completely cutting off the power supply. Here, in this example, the blocking refers to transition to the state in which the power supply is greatly reduced, or the power-saving-operation mode. Then, the operation-mode control unit 43 proceeds to the processing at step S110.

At step S110, the operation-mode control unit 43 compares the average power output Pstck of the fuel cell unit 10 and the average load power consumption Pcs after blocking the load 102. Subsequently, in the case that the average power output Pstck is greater than the average load power consumption Pcs after blocking the load 102 (Pstck≥Pcs), that is, the load 101 is operable by the output of the fuel cell unit 10, the operation-mode control unit 43 proceeds to the processing at step S111. On the other hand, in the case that the average power output Pstck is smaller than the average load power consumption Pcs (Pstck<Pcs) after blocking the load 102, that is, the load 101 is not operable by the output of the fuel cell unit 10, the operation-mode control unit 43 proceeds to processing at step S112.

At step S111, the operation-mode control unit 43 maintains the connection of the load 101 without instructing the load control unit 70 to change the control. In addition, in order that the output of a fuel cell unit 10 increases at a constant ratio, the operation-mode control unit 43 computes each of required fuel gas flow rate, water flow rate and air flow rate, and sends them to the active material supply unit 11 as command values. Thus, the active material supply unit 11 controls each pump based on the notified command values. In addition, the operation-mode control unit 43 controls the DC/DC converter 30 to cause the discharge current of the storage battery 21 become zero and surplus power generated by increased output to charge the storage battery 21. Therefore, in this case, the load 101 is operated by the output power of the fuel cell unit 10. Then, the operation-mode control unit 43 proceeds to the processing at step S101 after termination process at step S115.

On the other hand, at step S112, the operation-mode control unit 43 maintains the connection of the load without instructing the load control unit 70 to change the control. In addition, in order that the output of a fuel cell unit 10 increases at a constant ratio, the operation-mode control unit 43 computes each required fuel gas flow rate, water flow rate and air flow rate and sends them to the active material supply unit 11 as command values. Thus, the active material supply unit 11 controls each pump based on the notified command values. Further, since the output of the fuel cell unit 10 may not solely operate the connected load, the operation-mode control unit 43 controls the DC/DC converter 30 to cause the charge current of the storage battery 21 to become zero and discharge to take place.

Therefore, in this case, the loads 101 and 104 (the case subsequent to "No" at step S110) or the load 101 (the case subsequent to "No" at step S108) operate by power generated by the fuel cell unit and power discharged from the storage battery 21. Then, the operation-mode control unit 43 proceeds to processing at steps S101 after termination process at step S115.

On the other hand, at step S113 subsequent to any of steps S104, 105 and 106, the connected loads 101 and 104 cannot operate solely by the output of the fuel cell unit 10 or by the output of the storage battery 21 and the output of the may fuel cell unit 10. Therefore, the operation-mode control unit 43 determines, assuming that the load with the highest priority among the disconnected loads (the load 102 in this case) is reconnected, whether the loads 101, 102 and 104 are operable for a predetermined operation time t2 (the second predetermined operation time) or longer. The predetermined operation time t2 may be appropriately set or changed by the user or the like in a range of t2>t1.

Hence, similarly to as described at step S107, the estimate computing unit 42 estimates a prospective power generation G'stck until the predetermined time t based on the temperature Tstck of the cell-stack unit 13 according to the power generation characteristic table. In addition, the estimate computing unit 42 estimates a prospective load power consumption W't of the loads 101, 102 and 104 until the predetermined time t. At this time, since the load 102 is disconnected, the power consumption thereof is estimated based on the power consumption in the case of the load being connected in the past or estimated by a reference to an input value.

In addition, similarly to as described in the step S107, the estimate computing unit 42 estimates, in the case of the load 102 being connected, dischargeable time t'batL until the level of the storage battery 21 reaches the lowest remaining level EbatL and power generation reaching time t'eq until Pstck=Pcs.

Then, the operation-mode control unit 43 compares the dischargeable time t'batL and the power generation reaching time t'eq. Subsequently, in the case that the dischargeable time t'batL is longer than the power generation reaching time t'eq (t'batL≥t'eq), i.e., the power generation reaching time t'eq elapses without the storage battery 21 reaching the lowest remaining level EbatL, the loads 101, 102 and 104 may be continuously supplied with power ("Yes" at step S113). In this case, the operation-mode control unit 43 determines the loads 101, 102, and 104 are continuously operable for the predetermined operation time t2 or longer, and proceeds to processing at step S114.

Then, at step S114, the operation-mode control unit 43 instructs the load control unit 70 to reconnect the load 102. Thus, the load 102 is connected and restarts operating. Then, the operation-mode control unit 43 proceeds to processing at step S101 after a termination process at step S115.

On the other hand, at step S113, in the case that the dischargeable time t'batL is shorter than the power generation reaching time t'eq (t'batL<t'eq), the level of the storage battery 21 may reach the minimum remaining level EbatL before completion of load following operation. In this case, the operation-mode control unit 43 determines whether the loads 101, 102 and 104 is continuously operable for the predetermined operation time t2 based on a comparison of the predetermined operation time t2 and the dischargeable time t'batL.

Subsequently, in the case that predetermined operation time t2 is shorter than the dischargeable time t'batL (t2<t'batL) ("Yes" at step S113), the operation-mode control unit 43 determines that the loads 101, 102 and 104 are continuously operable for the predetermined operation time t2 or longer, and then proceeds to processing at step S114. In contrast, in the case that the predetermined operation time t2 is longer than the dischargeable time t'batL (t2≥t'batL) ("No" at step S113), it is determined that the loads 101, 102 and 104 are not continuously operable for the predetermined operation time t2 or longer. In this case, without instructing the load control unit 70 to connect the load 102, the operation-mode control unit 43 proceeds to processing at step S101 after termination process at step S115.

By the operation described above, on the self-sustaining operation, power is preferentially allocated with the load with higher priority.

Second Example

Figure 3:
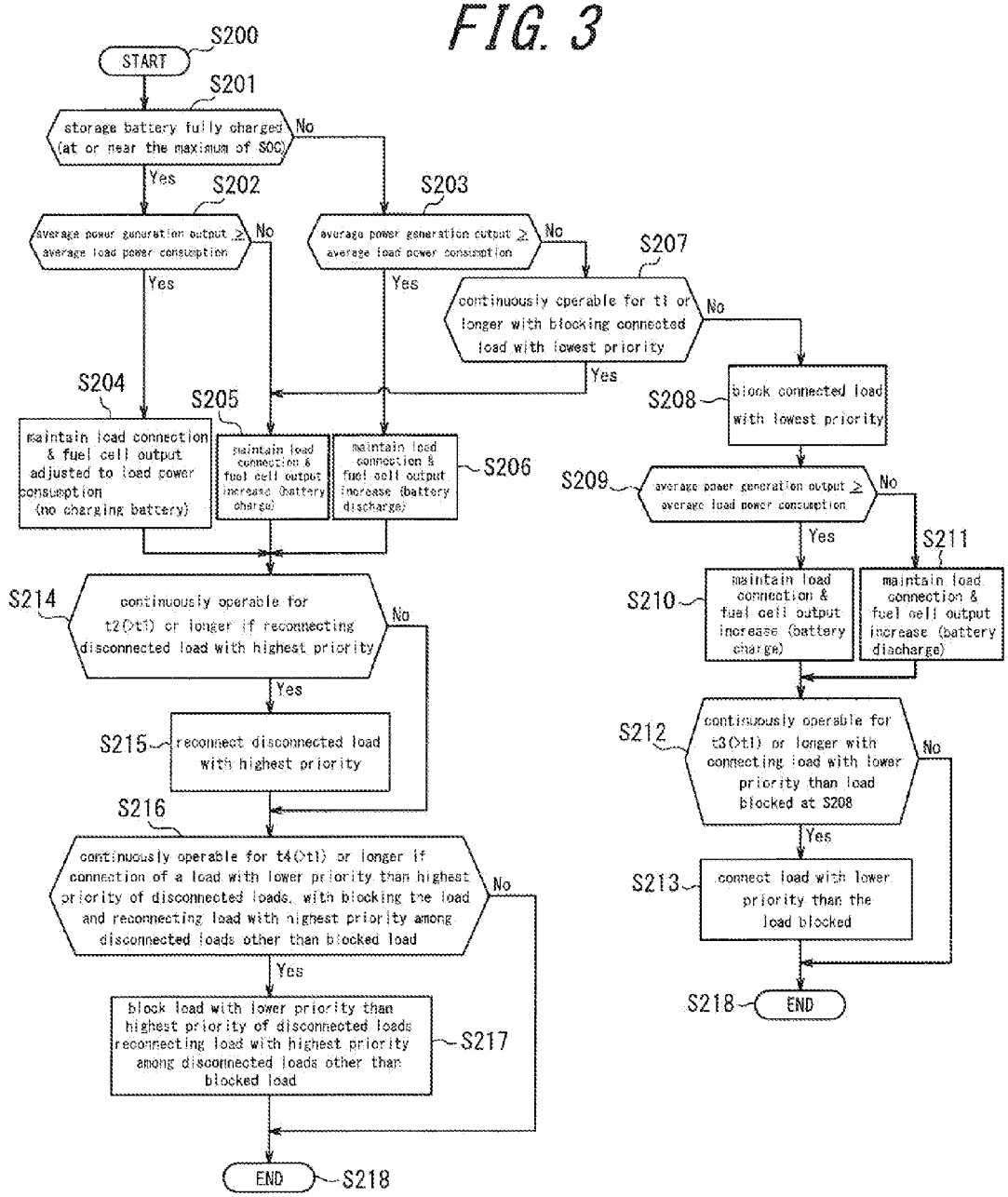
FIG. 3 is a flow-chart illustrating another control operation according to a power supply control method of the power supply control system of FIG. 1.

FIG. 3 is a flow-chart illustrating a second example. In the second example, in the case that the load with large power consumption and high priority is not operable due to lack of capacity and output shortage, the power is allocated to the load with small power consumption so that the power is preferentially allocated to the load with higher priority. Hereafter, similarly to the first example, the loads 101 and 104 are assumed to be operational (connected) state.

Steps S200-S206 correspond to processing of steps S100-S106 of FIG. 2, and thus their description is omitted.

At step S207, similar process to that of step S107 of FIG. 2 is executed. In the case that the dischargeable time t'batL is longer than the power generation reaching time t'eq (t'batL≥t'eq), or a predetermined operation time t1 is shorter than the dischargeable time t'batL (t1<t'batL) ("Yes" at step S207), the operation-mode control unit 43 determines that the loads 101 and 104 are continuously operable than a predetermined operation time t1, and proceeds to process the normal-operation mode at step S205. In contrast, in the case that the dischargeable time t'batL is shorter than the power generation reaching time t'eq (t'batL<t'eq), and the predetermined operation time t1 is longer than the dischargeable time t'batL (t1≥the t'batL) ("No" at step S207), the operation-mode control unit 43 determines that the loads 101 and 104 are not continuously operable for the predetermined operation time t1, and proceeds to a process of power-saving-operation mode at step S208. Here, the power-saving-operation mode is an example of a state with reduced power supply, or may a state with complete power shut down.

At step S208, the operation-mode control unit 43 instructs the load control unit 70 to block the load 104 with the lowest priority among the connected loads 101 and 104. Subsequently, the load 104 is blocked, and the power-saving-operation mode starts. Then, the operation-mode control unit 43 proceeds to processing at step S209.

At step S209, similarly to step S203, the operation-mode control unit 43 compares the average power output Pstck of the fuel cell unit 10, which is computed at step S202, and the average load power consumption Pcs. Subsequently, in the case that the average power output Pstck is greater than the average load power consumption Pcs after blocking the load 102 (Pstck≥Pcs), the operation-mode control unit 43 proceeds to processing at step S210. In contrast, in the case that the average power output Pstck is smaller than the average load power consumption Pcs after blocking the load 102 (Pstck<Pcs), the operation-mode control unit 43 proceeds to processing at step S211.

At step S210, the operation-mode control unit 43 maintains the connection of the load 101 without instructing the load control unit 70 to change the control. In addition, in order that the output of a fuel cell unit 10 increases at a constant ratio, the operation-mode control unit 43 computes each of the required fuel gas flow rate, water flow rate and air flow rate, and sends them to the active material supply unit 11 as command values. Thus, the active material supply unit 11 controls each pump based on the notified command values. In addition, the operation-mode control unit 43 controls the DC/DC converter 30 to cause the discharge current of storage battery 21 to become zero, and the storage battery 21 to be charged by surplus power generated by the increased output. Therefore, in this case, the load 101 is operated by the output power of the fuel cell unit 10. Then, the operation-mode control unit 43 proceeds to processing at step S212.

On the other hand, at step S211, the operation-mode control unit 43 maintains the connection (operation) of the load 101 without instructing the load control unit 70 to change the control. In addition, in order that the output of the fuel cell unit 10 increases at a constant ratio, the operation-mode control unit 43 computes each of the required fuel gas flow rate, water flow rate and air flow rate, and sends them as command values to the active material supplying unit 11. Thus, the active material supply unit 11 controls each pump based on the notified command values. Further, since the connected loads are not operable solely by the output of the fuel cell unit 10, the operation-mode control unit 43 controls the DC/DC converter 30 to cause the charge current of the storage battery 21 to become zero, and discharge to take place. Therefore, in this case, the load 101 is operated by the output power of the fuel cell unit 10 and the discharge power of the storage battery 21. Then, the operation-mode control unit 43 proceeds to processing at step S212.

At step S212, controller 40 determines, in the case that a load, among disconnected loads, with lower priority by one degree than the load 104 blocked at step S208 (in this case, the load 105) is connected, whether the loads are continuously operable or not for the predetermined operation time t3 (the third operation time) or longer. The predetermined operation time t3 may be equal to or different from t2 of the first example, and may be arbitrarily set or changed by a user or the like in a range of t3>t1.

Therefore, similarly to processing at step S113 of FIG. 2, the estimate computing unit 42 estimates the prospective power generation G'stck until a predetermined time t based on the temperature Tstck of the cell-stack unit 13 according to the power generation characteristic table stored in the data memory 41. In addition, the estimate computing unit 42 estimates the power consumption W't (=Pcst) by the loads 101 and 105 until a predetermined time t.

In addition, the estimate computing unit 42 estimates the dischargeable time t'batL until the level of the storage battery 21 reaches the minimum remaining level EbatL, by using estimated projected power generation G'stck and projected load power consumption W't. Then, the estimate computing unit 42 computes time, as t'eq, until the average power output Pstck becomes equal to the average load power consumption Pcs (Pstck=Pcs).

The operation-mode control unit 43 compares the dischargeable time t'batL and the power generation reaching time t'eq which are computed by the estimate computing unit 42. Subsequently, in the case that the dischargeable time t'batL is longer than the power generation reaching time t'eq (t'batL≥t'eq), the loads 101 and 105 may be continuously supplied with power for the predetermined operation time t3 or longer, and thus the operation-mode control unit 43 proceeds to processing at step S213.

On the other hand, in the case that dischargeable time t'batL is shorter than the amount of power generation reaching time t'eq (t'batL<t'eq), the operation-mode control unit 43 determines whether the loads 101 and 105 are continuously operable for the predetermined operation time t3 or longer. Subsequently, in the case that the dischargeable time t'batL is longer than predetermined operation time t3 (t3<t'batL), it is determined that the loads 101 and 105 are continuously operable for the predetermined operation time t3 ("Yes" at step S212), the operation-mode control unit 43 proceeds to processing at step S213.

In the case that the dischargeable time t'batL is shorter than the predetermined operation time t3 (t3≥t'batL), it is determined that (No at step S212) that loads 101 and 105 are continuously operated for the predetermined operation time t3 or longer, and the operation-mode control unit 43 proceeds to processing at step S201 after completion of the processing at step S218. Therefore, in this case, the load 101 solely is operated in self-sustaining operation.

At step S213, the operation-mode control unit 43 instructs the load control unit 70 to connect the load, among disconnected loads, with lower priority by one degree than the load 102 blocked (in this case, load 105). Subsequently, the load 105 is operated by self-sustaining operation along with the load 101. Then, the operation-mode control unit 43 proceeds to processing at step S201 after completion of the processing at step S218.

By the operation described above, in the case that the load with large power consumption and high priority are not usable due to lack of capacity and shortage of output, power is allocated to the load with small power consumption and lower priority than that load.

On the other hand, at step S214, the connected loads 101 and 104 are continuously operable solely by the output of the fuel cell unit 10, or by output of the fuel cell unit 10 and discharge of the storage battery 21. Here, similarly to step S113 of FIG. 2, the operation-mode control unit 43 determines, assuming that the load with the highest priority among the disconnected loads (in this case, the load 102) is reconnected, whether or not the loads 101, 102 and 104 are continuously operable for the predetermined operation time t2 (the second predetermined operation time) or longer.

Subsequently, in the case that the dischargeable time t'batL is longer than the power generation reaching time t'eq (t'batL≥t'eq), or, the predetermined operation time t2 is shorter than the dischargeable time t'batL (t2<t'batL) ("Yes" at step S214), the operation-mode control unit 43 determines that loads 101, 102 and 104 are continuously operable for the predetermined operation time t2 or longer, and proceeds to processing at step S215. In contrast, in case that predetermined operation time t2 is longer than the dischargeable time t'batL (t2≥t'batL) ("No" at step S214), it is determined that the loads 101, 102 and 104 are not continuously operable for the predetermined operation time t2, and the operation-mode control unit 43 proceeds to processing at step S216.

At step S215, the operation-mode control unit 43 instructs the load control unit 70 to reconnect the load 102. Thus, the load 102 is connected, and starts operation. Then, the operation-mode control unit 43 proceeds to processing at step S216.

At step S216, in the case that the load with lower priority than the highest priority among the disconnected load is connected, the operation-mode control unit 43 determines, assuming that the connected load of the lower priority is blocked and that the load with the highest priority among the disconnected loads different from the blocked load is connected, whether continuous operation is possible for a predetermined operation time t4 (the fourth predetermined operation time) or longer.

That is, in the case of "No" at step S214, the loads 101 and 104 are operating, and it is determined, assuming that the load 104 is blocked and the load 102 is reconnected, whether continuous operation for the predetermined operation time t4 or longer is possible. Or, in the case after step S215, the loads 101, 102 and 104 are operating, and it is determined, assuming the load 104 is blocked and the load 103 is reconnected, whether continuous operation for the predetermined operation time t4 or longer is possible.

Therefore, the estimate computing unit 42 executes the processing as in the case of steps S207, S212 and S214. Then, in the case that, assuming connection of the loads, in the case that the dischargeable time t'batL is longer generation reaching time t'eq (t'batL≥t'eq) or the predetermined operation time t4 is shorter than the dischargeable time t'batL (t4<t'batL), the operation-mode control unit 43 determines that continuous operation for the predetermined operation time t4 or longer is possible ("Yes" at step S216), and proceeds to operating step S217. In contrast, in the case that the predetermined operation time t4 is longer than the dischargeable time t'batL (t4≥t'batL), it is determined that continuous operation for the predetermined operation time t4 is not possible ("No" at step S216), and the operation-mode control unit 43 proceeds to processing at step S201 after completion of the processing at step S218.

At step S217, the operation-mode control unit 43 instructs the load control unit 70 to block the load with the lower priority than the highest priority among the disconnected loads, and to connect the load with the highest priority among the disconnected loads different from the blocked load, according to the processing at step S216.

That is, in the case of "No" at step S214, it is instructed that the load 104 is blocked and the load 102 is connected. Subsequently, load 102 operates along with the load 101 on the self-sustaining operation. In the case after step S215, it is instructed that the load 104 is blocked and the load 103 is connected. Subsequently, the load 103 operates along with the loads 101 and 102 on the self-sustaining operation. However, step S217 may need to be bypassed immediately after the loads are connected at step S213. Then, the operation-mode control unit 43, then the process proceeds to processing at step S201 after completion of the processing at step S218.

With the above operation, power is preferentially allocated to the load of high priority.

Incidentally, the present invention is not limited to the above embodiments, and number of variations and modifications are applicable. For example, the power-generating equipment may be, not limited to the fuel cell, of other kinds such as a wind power-generating equipment, an internal combustion engine with a power generator, and the like. Further, the power storage may be, not limited to a battery, of other kinds such as a double-layer capacitor and the like. Also, in case that the connected load can be switched to the power-saving operation mode, the connected load may be switched to the power-saving operation mode to cause power-saving operation to take place. In such the case that a plurality of connected loads are switched to the power-saving mode, a control is applicable such that the dischargeable time in the case of the power-saving mode of the load of the highest priority among the plurality of the loads being canceled is obtained from the estimate computing unit 42, and the power-saving mode of the load with the highest priority is canceled in the case of the dischargeable time being longer than the power generation reaching time or longer than a fifth predetermined operation time which is longer than a predetermined operation time.

REFERENCE SIGNS LIST 10 fuel cell unit
11 active material supply unit
12 reforming unit
13 cell-stack
14 stack temperature detector
20 power storage
21 storage battery
22 SOC detector
30 DC/DC converter
40 controller
41 data memory
42 estimate computing unit
43 operation-mode control unit
50 inverter
60 load detection unit
70 load control unit
80 power failure detection unit
90 grid disconnector
101-105 load

The invention claimed is:

1. A power supply control system, which has a power-generating equipment and a power-storing device, comprising:
   a power storage level detector configured to detect a remaining level of the power-storing device;
   a computing unit and a controller,
   wherein the computing unit performs steps of:
      computing a prospective power generation of the power-generating equipment and a prospective load power consumption of the connected load;
      computing dischargeable time of the power-storing device until the remaining level reaches the minimum level based upon the prospective power generation, the prospective load power consumption and the remaining level detected by the remaining level detector;
      computing an average power generation output of the power-generating equipment and an average load power consumption of the load; and
      computing a power generation reaching time until the average power generation output reaches the average load power consumption, and
   the controller controls, in the case that the dischargeable time computed by the computing unit is shorter than the power generation reaching time, to reduce power consumption of the connected load.

2. The power supply control system according to claim 1, wherein in the case of the power supply control system operating disconnected with grid, the controller compares the dischargeable time computed by the computing unit and the power generation reaching time, and controls the connected load based upon the comparison.

3. The power supply control system according to claim 1, wherein the controller controls, in the case that at least the dischargeable time computed by the computing unit is shorter than the power generation reaching time, and equal to or shorter than a predetermined operation time, to reduce power consumption of the connected load.

4. The power supply control system according to claim 3, wherein if a plurality of loads of different priorities are each connected as the connected load and the dischargeable time computed by the computing unit is shorter than the power generation reaching time, the controller obtains from the computing unit a first dischargeable time which is a dischargeable time in a case that power consumption of a load with the lowest priority among a plurality of the connected loads is reduced, and if the first dischargeable time is shorter than the power generation reaching time and equal to or shorter than the predetermined operation time, the controller reduces power consumption of a load with the lowest priority among a plurality of the connected loads.

5. The power supply control system according to claim 3, wherein the controller controls to switch an operation mode of the connected load from a normal-operation mode to a power-saving-operation mode, to reduce power consumption.

6. The power supply control system according to claim 5, wherein if a plurality of loads of different priorities are each connected as the connected load, the controller obtains from the computing unit a second dischargeable time which is a dischargeable time in a case that a load with the highest priority among loads other than the connected load is connected in the normal-operation mode, and if the second dischargeable time is equal to or more than the power generation reaching time or the second dischargeable time is longer than a second predetermined operation time which is longer than the predetermined operation time, the controller controls to connect the load.

7. The power supply control system according to claim 5, wherein if a plurality of loads of different priorities are each connected as the connected load, the controller obtains from the computing unit a third dischargeable time which is a dischargeable time in a case that power consumption of a load with the lowest priority among loads among the connected load is reduced and that a load with a lower priority than the load of which power consumption is reduced among disconnected loads in the power-saving mode, if the third dischargeable time is longer than a third predetermined operation time which is longer than the predetermined operation time, the controller controls to connect the load.

8. The power supply control system according to claim 7, wherein if a load with a lower priority than the highest priority of the unconnected loads is connected, the controller controls to reduce power consumption of the load and to obtain from the computing unit a fourth dischargeable time which is a dischargeable time in a case that a load with the highest priority among disconnected loads other than the load of which power consumption is reduced is connected, and if the fourth dischargeable time is equal to or longer than the power generation reaching time, or the dischargeable time is longer than a fourth predetermined operation time which is longer than the predetermined operation time, the controller controls to connect the corresponding load.

9. The power supply control system according to claim 5, wherein if on the power saving mode a plurality of loads among the connected loads are to be on the power saving mode, the controller obtains from the computing unit a fifth dischargeable time which is a dischargeable time in a case that the power-saving mode of a load with the highest priority among the plurality of the loads is canceled, and if the fifth dischargeable time is equal to or longer than the power generation reaching time, or the dischargeable time is longer than a fifth predetermined operation time which is longer than the predetermined operation time, the controller controls to cancel the power-saving-operation mode of the load with the highest priority.

10. A power supply control method for a power-generating equipment and a power-storing device, comprising steps of:
    a remaining level detector detecting a remaining level of the power-storing device;
    a computing unit computing a prospective power generation of the power-generating equipment and a prospective load power consumption of the connected load;
    a computing unit computing dischargeable time of the power-storing device until the remaining level reaches the minimum level based upon the prospective power generation, the prospective load power consumption and the remaining level detected by the remaining level detector;
    a computing unit computing an average power generation output of the power-generating equipment and an average load power consumption of the load; and
    a computing unit computing a power generation reaching time until the average power generation output reaches the average load power consumption, and a controller controlling in the case that the dischargeable time computed by the computing unit is shorter than the power generation reaching time, to reduce power consumption of the connected load.

\* \* \* \* \*